US005683775A

United States Patent [19]

Franklin

[11] Patent Number: 5,683,775

[45] Date of Patent: Nov. 4, 1997

[54] PRESSURE SENSITIVE LABEL ROLL

[75] Inventor: Priscilla S. Franklin, Cincinnati, Ohio

[73] Assignee: Monarch Marking Systems, Inc., Dayton, Ohio

[21] Appl. No.: 661,528

[22] Filed: Jun. 11, 1996

[51] Int. Cl.$^{6}$ .......... B32B 3/10

[52] U.S. Cl. .......... 428/40.1; 206/411; 283/81; 428/41.7; 428/41.8; 428/41.9; 428/42.1; 428/42.2; 428/42.3; 428/194; 428/906

[58] Field of Search .......... 428/40.1, 42.2, 428/42.3, 41.9, 41.8, 41.7, 42.1, 194, 906; 206/411; 283/81

[56] References Cited

U.S. PATENT DOCUMENTS 2,957,637 10/1960 Hosken .......... 428/906

3,783,083 1/1974 Jenkins .......... 428/42.3

4,297,403 10/1981 Smith .......... 428/42.3

*Primary Examiner*—Nasser Ahmad

*Attorney, Agent, or Firm*—Joseph J. Grass

[57] ABSTRACT

There is disclosed a pressure sensitive label roll comprised of a composite label web having a carrier web and labels releasably adhered by pressure sensitive adhesive to the carrier web. The outer wrap of the label roll is adhesively secured to the inner wrap to bold the outer wrap in place until the label roll is ready to be used, and this adhesive holds the labels of the inner wrap to the carrier web of the outer wrap more weakly than the pressure sensitive adhesive holds the labels of the inner wrap to the carrier web of the inner wrap. This prevents labels from being delaminated from the inner wrap when the outer wrap is unwound by the user.

4 Claims, 1 Drawing Sheet

PRESSURE SENSITIVE LABEL ROLL

BACKGROUND OF THE INVENTION

1. Field of the Invention

This invention relates to the art of pressure sensitive label rolls

2. Background of the Invention

In the art of pressure sensitive adhesive label rolls, a complete label web having a carrier web and labels releasably adhered thereto is commonly wound into a roll. It is known to attach the outer wrap of the composite label web adhesively to the adjacent inner wrap to prevent unwanted self-unraveling of the outer wrap until the label roll is ready to be used. It has also been found that this technique results in labels on the inner wrap adhering to the carrier web of the outer wrap. Thus, the labels on the inner wrap which adhere to the carrier web of the outer wrap are essentially wasted.

It is known to lightly adhere the outer wrap or toilet paper rolls and paper towel rolls with a non-tacky adhesive on the theory that the outer wrap may be unwound from the inner wrap without tearing the inner wrap.

SUMMARY OF THE INVENTION

This invention relates to an improved pressure sensitive label roll comprised of or composite label web including a carrier web having labels releasably adhered to a carrier web. The composite label web is wound into a roll which has an outer wrap and an adjacent inner wrap. The labels are releasably held to the carrier web by pressure sensitive adhesive. There is additional adhesive adhering the carrier web of the outer wrap to one or more labels on the adjacent inner wrap more weakly than the pressure sensitive adhesive holds such label or labels of the inner wrap to the carrier web of the inner wrap. The additional adhesive prevents the self-unraveling of the outer wrap but enabling manual unwinding of the outer wrap without removing or delaminating any label from the inner wrap.

DETAILED DESCRIPTION OF THE PREFERRED EMBODIMENT

Figure 1:
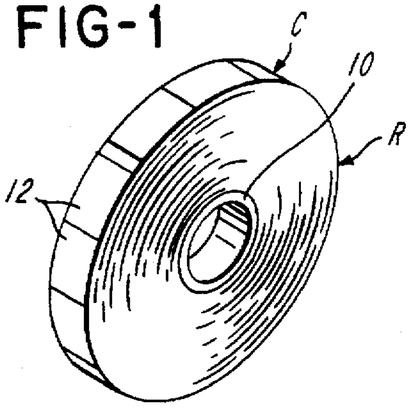
FIG. 1 is a perspective view showing a pressure sensitive label roll according to the invention.
Figure 2:
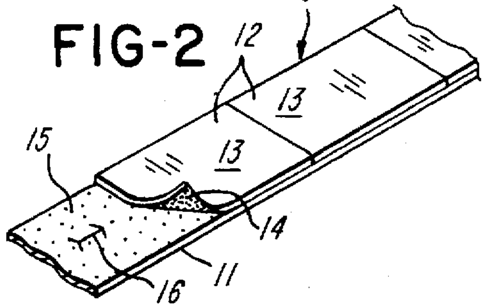
FIG. 2 is a fragmentary perspective view of a composite label web of which the label roll of FIG. 1 is comprised.

With reference to FIGS. 1 and 2, there is shown a label roll R preferably having a core 10 onto which a composite label web C is wound. The invention is applicable as well to careless pressure sensitive label rolls. The composite label web C includes a carrier web 11 to which labels 12 are releasably adhered. The labels 12 have an outer printable face 13 and a coating of pressure sensitive adhesive 14 on their undersides. The pressure sensitive adhesive 14 is inherently a tacky-type adhesive. The carrier web 11 has a release coating 15 of silicone for example to which the pressure sensitive adhesive 14 adheres the labels 12. The carrier web 11 preferably also has equally longitudinally spaced apart feed slits or holes 16 by which the composite web C can be advanced in a labeler of the general type as depicted for example in U.S. Pat. No. 3,783,083.

Figure 3:
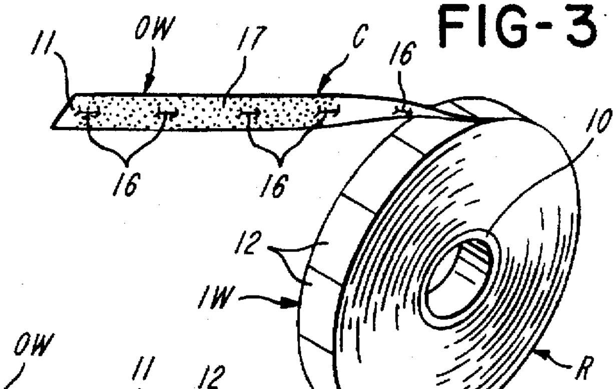
FIG. 3 is a perspective view of the label roll with a portion of the outer wrap unwound from the adjacent inner wrap.
Figure 4:
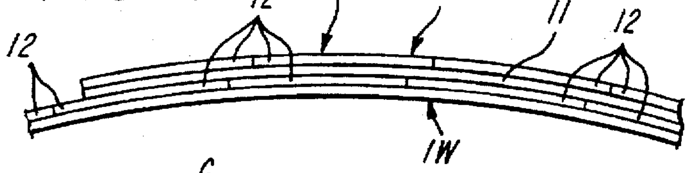
FIG. 4 is a fragmentary elevational view of portions of the outer wrap and the adjacent inner wrap of the label roll.
Figure 5:
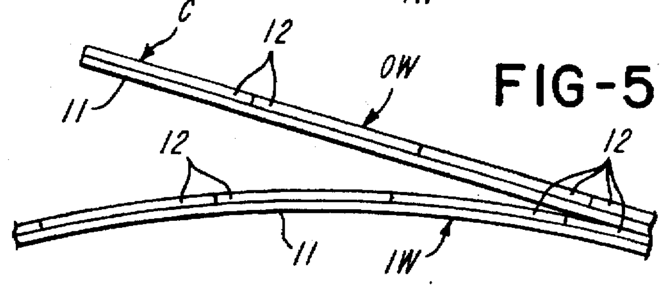
FIG. 5 is a view similar to FIG. 4, but showing a portion of the outer wrap unwound from the adjacent inner wrap.

FIG. 3 illustrates that an adhesive 17 is applied to the underside of the carrier web 11 during the manufacturing process. The adhesive 17 is considered to be additional adhesive to that of the adhesive 14. The adhesive 17 can extend over the length of one, two or more labels 12 if desired. The adhesive 17 weakly adheres the underside of the carrier web 11 of outer wrap or convolution OW to the faces 13 of labels 12 in the adjacent or underlying inner wrap or convolution IR. The adhesive 17 thus holds the outer wrap OW in place and prevents unwanted self-unraveling of the outer wrap OW until such time as the user manually unwinds the outer wrap OW from the inner wrap IW. As shown in FIG. 5, when the outer wrap OW is unwrapped, the labels 12 on the inner wrap IW do not adhere to the underside of the carrier web 11. Accordingly, none of the labels 12 is wasted. According to the invention, one or more of the labels 12 on the inner wrap IW are held more securely to the carrier web 11 of the inner wrap IW than that or those labels 12 are held to the carrier web 11 of the outer wrap OW. It is apparent that the releasable bond between the pressure sensitive adhesive 14 and the release coating 15 is stronger than the releasable bond between the adhesive 17 on the carrier web 11 of the outer wrap OW and the label or labels 12 on the inner wrap IW.

It is preferred that the adhesive 17 be of a type that leaves virtually no visible residue on either the carrier web 11 of the outer wrap OW or on the labels 12 of the inner wrap IW. It is also preferred that the adhesive 17 be of the non-tacky type so that the labels 12 on the inner wrap IW and the underside of the carrier web 11 of the outer wrap OW be essentially free and most preferably entirely free of tackiness or traces of adhesive which can cause gunsming problems in a hand-held labeler.

By way of example, not limitation, a preferred adhesive 17 is a non-tacky type adhesive which is sold by Swift Adhesives in Downers Grove, Ill., U.S.A. under the number 48072. This adhesive has a synthetic resin base, has a weight of 8.45 pounds per U.S. gallon, a viscosity of 900 cps to 1,100 cps and a pH between 6.5 and 7.5. This adhesive is appreciably water soluble. The boiling point is 212 degrees F., and the adhesive has a specific gravity of about 1 compared to water.

The adhesive 14 is considered to be a first adhesive and the adhesive 17 is considered to be a second adhesive. The second or additional adhesive 17 adheres a label 12 on the inner wrap IR move weakly to the carrier web 11 of the outer wrap OW than the first adhesive 14 adheres that label 12 on the inner wrap IR to the carrier web 11 of the inner wrap IR. The second adhesive 17 prevents self-unraveling of the outer wrap OW but enables manual unwinding of the outer wrap OW without delaminating any label 12 from the underlying inner wrap IR.

Figure 7:
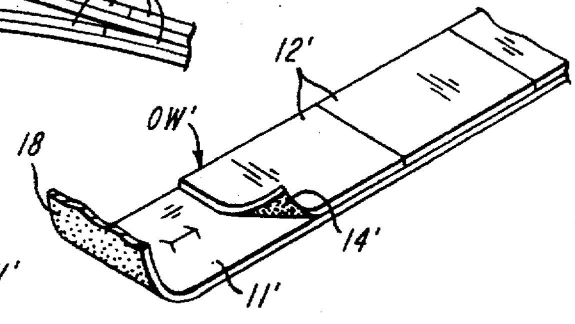
FIG-7 PRIOR ART
FIG. 7 is a perspective view of a composite label web of the label roll of FIG. 6 showing in particular the pressure sensitive adhesive on the labels and adhesive on the carrier web.
Figure 6:
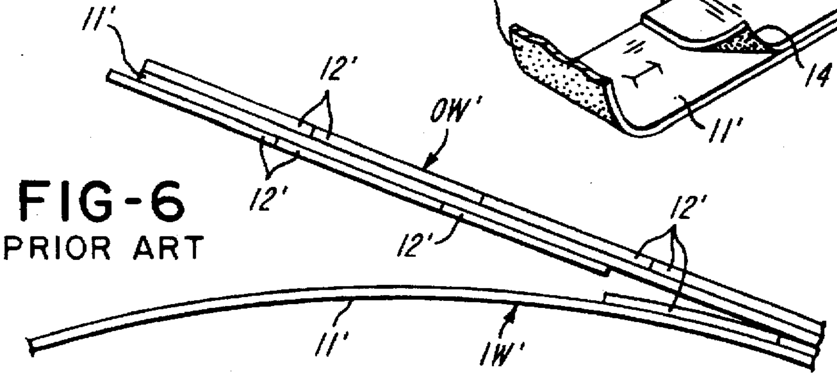
FIG-6 PRIOR ART
FIG. 6 is a view similar to FIG. 5 but showing the results of unwinding the outer wrap from the inner wrap in the prior art construction.

FIG. 6 illustrates the result with prior art pressure sensitive label rolls in which the marginal end portion of the carrier web 11' is secured to labels 12' on inner wrap IW' by an aggressive pressure sensitive adhesive 18. The adhesive 18 adheres or bonds the labels 12' of the inner wrap IW more securely to the underside of the carrier web 11' of the outer wrap OW than the pressure sensitive adhesive 14' adheres or bonds the labels 12' to the carrier web 11' of the inner wrap IW. Thus, the result is label delamination as shown in FIG. 6. FIG. 7 illustrates the two adhesives 14' and 18.

Other embodiments and modifications of the invention will suggest themselves to those skilled in the art, and all such of these as come within the spirit of this invention are included within its scope as best defined by the appended claims.

I claim:

1. A label roll, comprising: a composite label web including a carrier web and labels having pressure sensitive adhesive releasably adhered to the carrier web, the composite label web being wound into a roll and having an outer wrap, an adjacent inner wrap and the outer wrap being wound over the adjacent inner wrap, additional adhesive directly adhering one or more labels on the adjacent inner wrap more weakly to the carrier web of the outer wrap than the pressure sensitive adhesive adheres said label or labels of the inner wrap to the carrier web of the inner wrap, and the additional adhesive preventing self-unraveling of the outer wrap but enabling manual unwinding of the outer wrap without delaminating any label from the inner wrap.

2. A label roll, comprising: a composite label web including a carrier web and labels having pressure sensitive adhesive releasably adhered to the carrier web, the composite label web being wound into a roll and having an outer wrap, an adjacent inner wrap and the outer wrap being wound over the adjacent inner wrap, additional adhesive directly adhering one or more labels on the adjacent inner wrap more weakly to the carrier web of the outer wrap than the pressure sensitive adhesive adheres said label or labels of the inner wrap to the carrier web of the inner wrap, wherein the additional adhesive is non-tacky adhesive, and the additional adhesive preventing self-unraveling of the outer wrap but enabling manual unwinding of the outer wrap without delaminating any label from the inner wrap.

3. A label roll, comprising: a composite label web including a carrier web and labels having pressure sensitive adhesive releasably adhered to the carrier web, the composite label web being wound into a roll and having an outer wrap, an adjacent inner wrap and the outer wrap being wound over the adjacent inner wrap, additional adhesive directly adhering one or more labels on the adjacent inner wrap more weakly to the carrier web of the outer wrap than the pressure sensitive adhesive adheres said label or labels of the inner wrap to the carrier web of the inner wrap, the additional adhesive preventing self-unraveling of the outer wrap but enabling manual unwinding of the outer wrap without delaminating any label from the inner wrap, and wherein virtually no visible residue is on the labels of the inner wrap upon unwinding of the outer wrap.

4. A label roll, comprising: a composite label web including a carrier web and labels having pressure sensitive adhesive releasbly adhered to the carrier web, the composite label web being wound into a roll and having an outer wrap, an adjacent inner wrap and the outer wrap being wound over the adjacent inner wrap, additional adhesive directly adhering one or more labels on the adjacent inner wrap more weakly to the carrier web of the outer wrap than the pressure sensitive adhesive adheres said label or labels of the inner wrap to the carrier web of the inner wrap, wherein the additional adhesive is non-tacky adhesive, the additional adhesive preventing self-unraveling of the outer wrap but enabling manual unwinding of the outer wrap without delaminating any label from the inner wrap, and wherein virtually no visible residue is on the labels of the inner wrap upon unwinding of the outer wrap.

* * * * *

UNITED STATES PATENT AND TRADEMARK OFFICE

CERTIFICATE OF CORRECTION

PATENT NO. : 5,683,775

DATED : November 4, 1997

INVENTOR(S) : Priscilla S. Franklin

It is certified that error appears in the above-indentified patent and that said Letters Patent is hereby corrected as shown below:

Abstract, line 5 "bold" should be --hold--.

Col. 1, line 21 "or" should be --of--.

Col. 2, line 1 "careless" should be --coreless--.

Col. 2, line 44 "gunsming" should be --gumming--.

Col. 2, line 59 "move" should be --more--.

Col. 4, line 1 after "is" --a-- has been omitted.

Col. 4, line 30 after "is" --a-- has been omitted.

Signed and Sealed this

Fourteenth Day of April, 1998

Attest:

BRUCE LEHMAN

*Attesting Officer* *Commissioner of Patents and Trademarks*